United States Patent [19]
Boylan et al.

[11] Patent Number: 5,520,370
[45] Date of Patent: May 28, 1996

[54] GAS DISTRIBUTION MANIFOLD FOR METAL SCARFING APPARATUS

[75] Inventors: Stephen D. Boylan; Joseph Caporaso, both of Florence, S.C.

[73] Assignee: The ESAB Group, Inc., Florence, S.C.

[21] Appl. No.: 381,730

[22] Filed: Feb. 1, 1995

[51] Int. Cl.$^6$ ........................................... B23K 7/06
[52] U.S. Cl. ............................... 266/51; 266/48
[58] Field of Search .................. 266/48, 51; 239/553

[56] References Cited

U.S. PATENT DOCUMENTS

| | | | |
|---|---|---|---|
| 2,515,301 | 7/1950 | Hughey | 266/51 |
| 3,224,748 | 12/1965 | Buddenhagen | 266/51 |
| 4,062,495 | 12/1977 | Lück | 266/48 |
| 5,358,221 | 10/1994 | Showalter et al. | 266/48 |

*Primary Examiner*—Scott Kastler
*Attorney, Agent, or Firm*—Bell, Seltzer, Park & Gibson

[57] ABSTRACT

A metal scarfing apparatus having provision for controlling the scarfing depth of cut in separate areas across the width of the hot workpiece, to thereby compensate for the effects of temperature and/or quality variations and achieve a uniform surface. The apparatus comprises a gas distribution manifold having an internal gas distribution bore, and the bore communicates via a plurality of radial drillings with each of a plurality of scarfing units mounted to the manifold in a side-by-side arrangement. The bore in the manifold is divided into three chambers having separately controllable gas delivery systems, so as to permit independent control of the depth of cut in each of the width segments of the workpiece corresponding to the three bore chambers. Also, the central chamber of the bore is adjustable in length so as to accommodate workpieces of varying width.

8 Claims, 3 Drawing Sheets

GAS DISTRIBUTION MANIFOLD FOR METAL SCARFING APPARATUS

FIELD OF THE INVENTION

This invention relates to an apparatus for thermochemically scarfing a metal workpiece, and more particularly, to a gas distribution manifold for a scarfing apparatus and which is able to achieve a uniformly scarfed surface on metal workpieces of nonuniform temperature and/or metallurgical quality.

BACKGROUND OF THE INVENTION

Hot steel slabs are commonly conditioned by positioning scarfing units along the top, bottom, and side surfaces of an advancing slab to eliminate surface defects such as cracks, seams, and slag intrusions. One conventional scarfing apparatus includes top, bottom, and opposite side scarfing units that are mounted across the width and end portions of a support, to concurrently scarf all sides of the slab as the slab is passed therebetween.

The top, side, and bottom scarfing units each include a gas distribution manifold, which receives and distributes oxygen, fuel gas, and cooling water to a number of scarfing units which are positioned in a side by side arrangement along the front of the manifold. As illustrated, for example, in U.S. Pat. Nos. 4,115,154 and 5,234,658, each scarfing unit comprises upper and lower preheat blocks which are spaced from each other to define an oxygen scarfing slot between the two blocks and through which a quantity of oxygen is discharged onto the slab surface to enable scarfing.

It is normally desirable to obtain a uniform depth of cut across the full width of the advancing workpiece, and this objective is often not achieved where the workpiece has a temperature variation, or a variation in metallurgical quality, across its width. More particularly, the temperature near one or both edges of the advancing workpiece is often lower than the temperature in the middle of the workpiece, and in this event the metal removal is reduced near the low temperature edges. Such a result is also possible where there is a variation in the metallurgical quality adjacent the side edges of the workpiece.

It is accordingly an object of the present invention to provide a metal scarfing apparatus having provision for overcoming the effects of variations in temperature or metallurgical quality across the width of the workpiece, and to thereby achieve a uniform metal removal depth of cut across the width under such conditions.

It is a more particular object of the present invention to provide a metal scarfing apparatus which is capable of separately controlling the metal removal depth of cut near the two side edges of the advancing workpiece, so as to overcome non-uniform temperature and quality effects, and so as to achieve a uniform removal across the width under such conditions.

SUMMARY OF THE INVENTION

The above and other objects and advantages of the present invention are achieved in the embodiment illustrated herein by the provision of a gas distribution manifold for a scarfing apparatus which comprises a block of metallic material including an elongate mounting surface formed on one face thereof and which defines a longitudinal direction. At least one gas distribution bore is formed in the block which extends parallel to the longitudinal direction and which defines a first end and an opposite second end, and a plurality of longitudinally spaced apart drillings extending radially from the bore to the mounting surface. A partition is fixed in the bore at a location adjacent but spaced from the first end so as to define a first chamber in the bore between the first end and the partition. A piston is slidably mounted in the bore at a location between partition and second end so as to define a second chamber in the bore between the partition and piston. The piston includes a pair of longitudinally spaced apart piston heads defining a third chamber in the bore between the piston heads. A first gas inlet communicates with the first chamber, a second gas inlet communicates with the second chamber, and a third gas inlet communicates with the third chamber. Preferably, the third gas inlet comprises a tubular piston rod connected to the piston heads, and a plurality of openings in the tubular piston rod between said piston heads. By this arrangement, the axial extend of the second chamber may be varied by longitudinally moving piston to thereby vary the number of the drillings which are open to one of the three chambers.

The metal scarfing apparatus of the present invention further comprises control means operatively connected to each of the three gas inlets for permitting the pressure of the gas delivered to each of the gas inlets to be separately controlled. Thus the depth of the scarfing cut for the longitudinal segments of the width of the advancing workpiece which respectively correspond to the length of the three chambers of the bore in the manifold, may be separately controlled.

The apparatus of the invention further comprises a plurality of scarfing units mounted in a side by side arrangement along the mounting surface of the manifold, the scarfing units each including a rear face contiguous to the mounting surface and a forwardly facing front face. Also, a plurality of ducts extend through each of scarfing units from the rear face to the front face thereof, with the ducts communicating with respective ones of the drillings at the interface of the mounting surface and the rear face. Thus a gas may be delivered from the three chambers of the bore to the ducts of the scarfing units and discharged from the front faces thereof along a variable longitudinal length dimension by control of the longitudinal position of piston.

BRIEF DESCRIPTION OF THE DRAWINGS

Some of the objects and advantages of the present invention having been stated, others will appear as the description proceeds, when taken in conjunction with the accompanying drawings, in which.

DETAILED DESCRIPTION OF PREFERRED EMBODIMENTS

Figure 1:
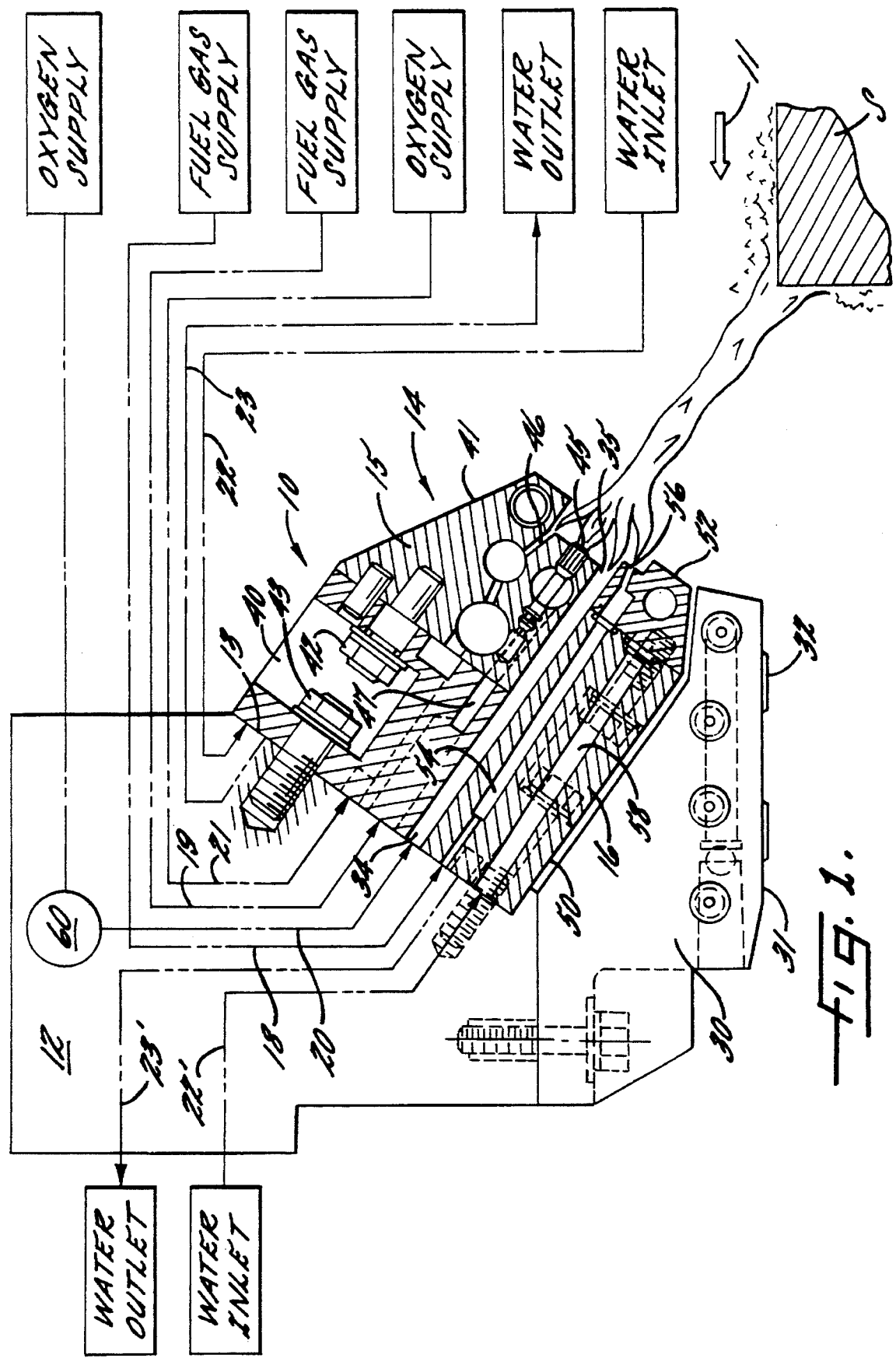
FIG. 1 is a partly sectioned and partly schematic side elevation view of a scarfing apparatus which is adapted to embody the features of the present invention and which is positioned for preheating a steel slab before the commencement of the scarfing operation.

Referring more particularly to the drawings, FIG. 1 illustrates a scarfing apparatus 10 which is adapted to embody the features of the present invention and which is positioned to scarf the upper surface of a workpiece, which typically comprises a steel slab S. It will be understood that an overall scarfing system typically comprises similar scarfing apparatuses positioned above and below the plane of the steel slab S to be scarfed, with the upper and lower scarfing apparatuses extending across the full width of the slab S. Additionally, side scarfing apparatuses of like design are positioned so as to scarf the sides of a slab S. The slab S normally is positioned on a movable roll table (not shown) so as to be fed through the rectangular configuration defined by the several scarfing apparatuses, and in the direction of the arrow 11.

As shown in FIG. 1, the apparatus 10 includes a gas distribution manifold 12, typically formed from a block of bronze or copper material, and the block defines a generally planar front mounting surface 13 which defines a longitudinal direction which is perpendicular to the plane of FIG. 1. A plurality of scarfing units 14 are mounted in a side by side arrangement along the longitudinal direction of the mounting surface 13 as seen in FIGS. 2–5. Each scarfing unit 14 comprises an upper preheat block assembly 15 and a lower preheat block assembly 16. The block of the manifold 12 also includes a pair of internal fuel gas lines 18 and 19, a pair of oxygen lines 20 and 21, inlet and outlet water lines 22 and 23 respectively leading to the upper block assembly, and inlet and outlet water lines 22' and 23' respectively, leading to the lower block assembly 16. All of these lines communicate with the front surface 13 for the purposes described below.

A riding shoe 30 is mounted to the manifold and head assembly 12 along the underside of the lower preheat block 16. The riding shoe 30 includes a lower surface 31 having slab engaging skids 32 adapted to contact the slab to position the scarfing apparatus 10 a predetermined distance from the steel slabs as further described below. As shown in FIG. 1, the scarfing apparatus 10 is above the slab S, and it will be understood that similar apparatuses are arranged below and at the opposite sides of the slab S.

The upper preheat block assembly 15 and the lower preheat block assembly 16 are spaced from each other to define an oxygen slot 34 and discharge orifice 35 of predetermined size for receiving a flow of scarfing oxygen from the oxygen line 20 of the manifold and head assembly and discharging the scarfing oxygen through the discharge orifice 35 onto the steel slab S during the scarfing operation.

The upper preheat block assembly 15 includes a base member 40, and an extension 41 secured to the base member by bolts 42 and extending forwardly therefrom. The base member 40 comprises a block of metallic material, preferably copper, and the rear face of the base member is releasably secured to the front surface 13 of the manifold 12 by means of bolts 43.

The extension 41 of the upper preheat block assembly also comprises a block of metallic material, preferably copper, and it includes a plurality of discharge openings 45 which are positioned adjacent to each other in a longitudinal row along the front face and extending rearwardly into the block. Also, a longitudinally extending row of discharge outlets 46 is provided in the front face of the extension, with the row of outlets 46 extending parallel to and above the row of openings 45. A plurality of ducts, generally indicated at 47, communicate with respective ones of the gas and water supply lines 19, 21–23 at the mounting surface 13, and extend through the block assembly 15 to the openings 45 and outlets 46 in the front face of the assembly.

The lower preheat block assembly 16 includes a base member 50, and an extension 52 secured to the base member 50 and extending forwardly therefrom. The base member 50 includes a plurality of parallel ducts 54, which communicate with a slot 56 which extends longitudinally across the front face of the extension 52. The ducts 54 also communicate with the fuel gas supply line 18 in the gas distribution manifold Also, a plurality of ducts 58 extend through the assembly 16 and communicate with the water lines 22' and 23' for circulating cooling water through the assembly.

The structural and functional features of the upper block assembly 15 and the lower block assembly are further described in U.S. Pat. Nos. 5,358,221 and 5,333,841, the disclosures of which are expressly incorporated herein by reference.

The steps involved in the initial starting and operation of the scarfing apparatus of the present invention are described in detail in the above referenced U.S. Pat. No. 5,333,841. To briefly summarize, the table (not shown) on which the steel slab S rests is moved into a position in which the scarfing apparatus 10 is positioned over and adjacent an end of the slab. The scarfing apparatus preheat fuel gas is then ignited at a low flow rate, and the preheat oxygen is also discharged at a low flow rate. The preheat fuel gas flow rate is then increased, and just after the preheat fuel gas flow rate is increased, the oxygen preheat flow is increased, and this flow includes a stabilizing oxygen stream immediately above the preheating gas stream emanating from the discharge outlets.

Once the steel slab is preheated, the preheated oxygen flow is substantially reduced and the flow of scarfing oxygen is generated through the slot 34. When the scarfing oxygen has reached its peak pressure and flow rate, the preheating fuel gas is reduced, and the table holding the steel slab is moved toward the scarfing apparatus. The table is initially moved forward at a first relatively slow speed, which is typically about 3 to 4 meters per minute, and after a predetermined period, its speed is increased to the normal scarfing speed, which is about four times as fast as the first speed. The flow rate of the oxygen is decreased slightly at the time when the table speed reaches the normal scarfing speed. Scarfing then continues, and preferably a stream of fuel gas is concurrently discharged from the slot 56 of the lower block assembly 16, to facilitate maintenance of the oxidizing reaction. Also, the manifold 12 and its associated upper block assembly 15, lower preheat block 16 and shoe 30 move so that the skids 32 come into contact with the moving slab S, and the entire apparatus 10 "floats" with the riding skids 32 in contact with the moving slab.

Figure 2:
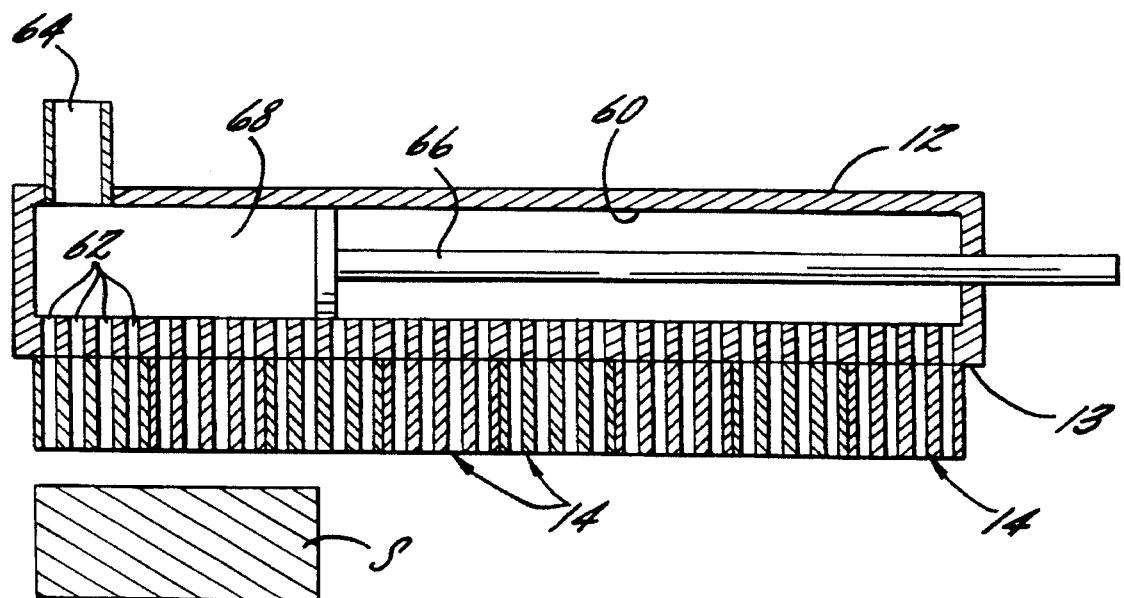
FIG. 2 is a schematic end view of the scarfing apparatus and steel slab in accordance with the prior art, and with the apparatus adjusted for scarfing a slab of relatively short width.
Figure 3:
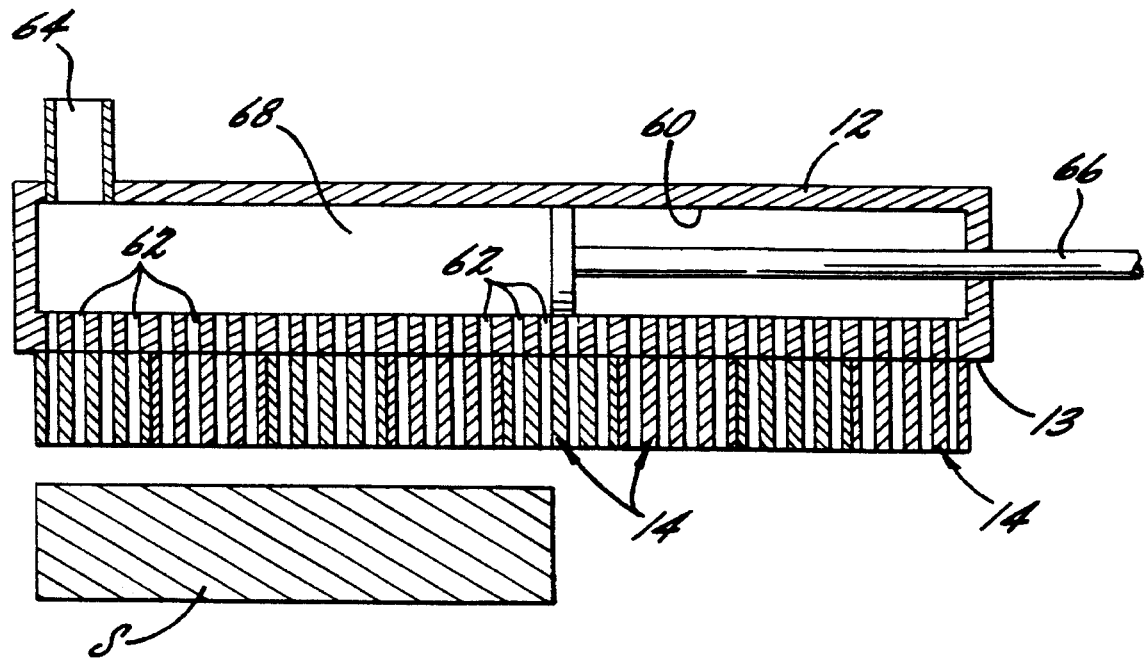
FIG. 3 is a view similar to FIG. 2, with the apparatus adjusted for processing a slab of longer width.

FIGS. 2 and 3 illustrate the prior art system for controlling the operation of the scarfing units 14 as described above, to accommodate workpieces S of varying width. While the illustrated embodiment relates to the delivery of only one of the gases to the scarfing units, it will be understood that similar arrangements may be provided for the second gas and water.

As illustrated in FIGS. 2 and 3, the gas distribution manifold 12 includes a gas distribution bore 60 in the manifold 12 which extends parallel to the longitudinal direction defined by the mounting surface 13. A plurality of longitudinally spaced apart drillings 62 extend radially from the bore 60 to the mounting surface 13. Also, a gas inlet 64 is connected to the bore 60 adjacent its left end as illustrated, for introducing a gas into the bore 60, and a longitudinally movable piston 66 is mounted in the bore 60 to define a distribution chamber 68 of variable longitudinal length between the left end of the bore and the piston 66.

A plurality of scarfing units 14 as described above are mounted in a side-by-side arrangement along the mounting surface 13, and the scarfing units 14 each include a rear face which is contiguous to the mounting surface and a forwardly facing front face. The above described ducts 34, 47, 58 extend through each of the scarfing units from the rear face to the front face thereof, and these ducts communicate with respective ones of the drillings 62 at the interface of the mounting surface 13 and the rear faces of the scarfing units. By this arrangement, a gas may be delivered from the distribution chamber 68 of the bore 60 to the ducts of the scarfing units 14 and discharged from the front faces thereof along a variable longitudinal dimension which is controlled by the longitudinal position of the piston 66. This control is illustrated in FIG. 3, which illustrates that a number of additional scarfing units 14 may be brought into operation by withdrawal of the piston 66 which serves to open additional ones of the drillings 62 to the distribution chamber 68 of the bore 60, and to thereby accommodate a workpiece of longer width.

Figure 4:
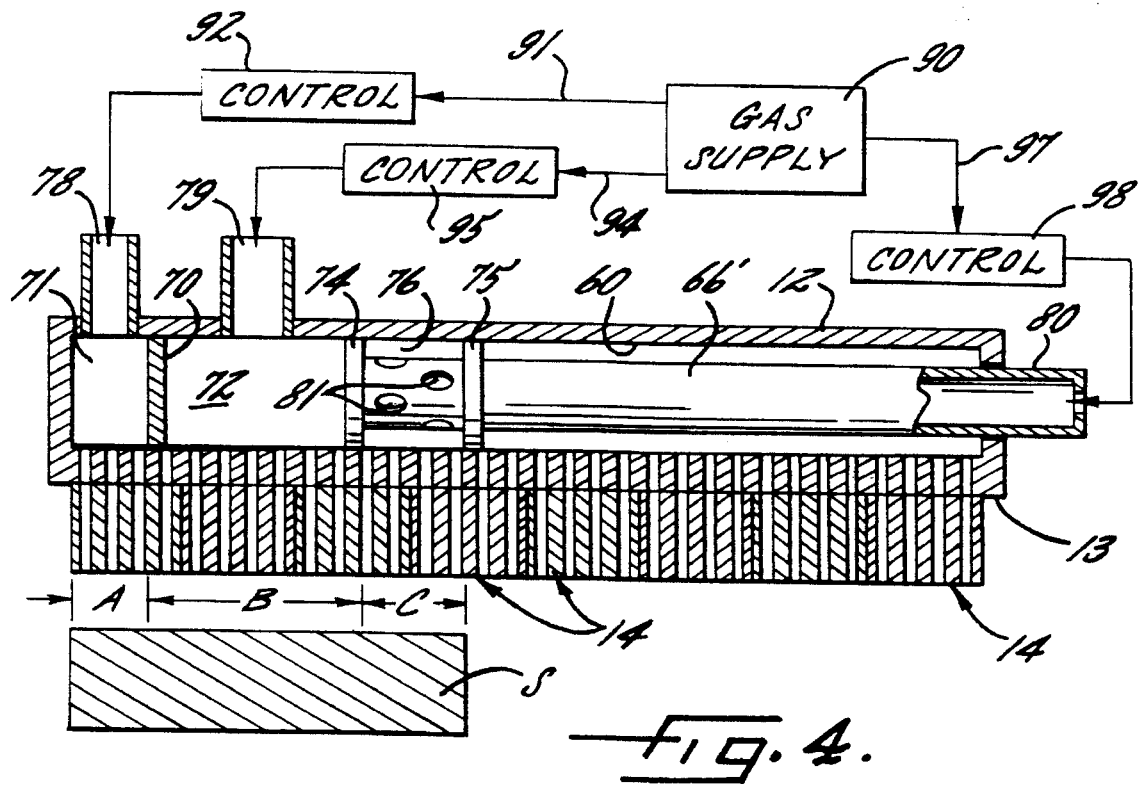
FIG. 4 is a schematic end view of the scarfing apparatus and steel slab in accordance with the present invention, and with the apparatus adjusted for processing a slab of relatively short width.
Figure 5:
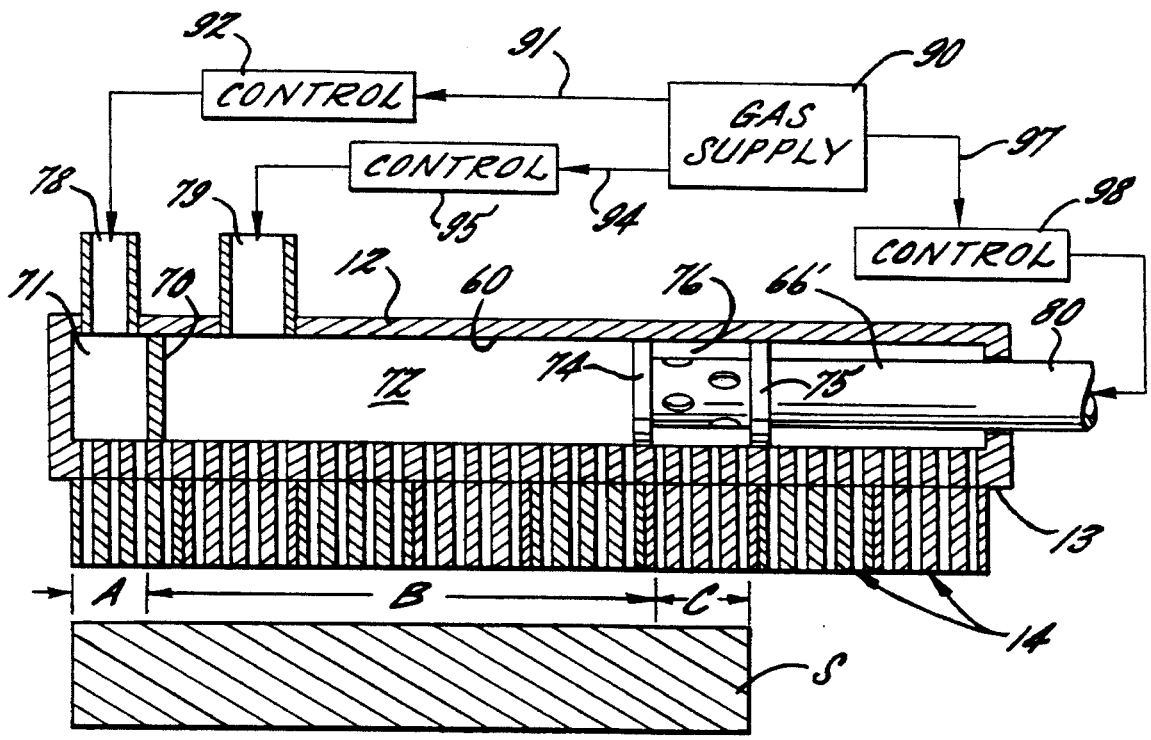
FIG. 5 is a view similar to FIG. 4, with the apparatus adjusted for processing a slab of longer width.

FIGS. 4 and 5 are similar to FIGS. 2 and 3 respectively, but illustrate the modifications provided by the present invention. In particular, as illustrated in FIGS. 4 and 5, the distribution bore 60 includes a fixed partition 70 dividing the same into a first distribution chamber 71 between the left end and the partition, with the chamber 71 being aligned with a first side edge portion or band A of the workpiece, which is of fixed dimension. Also, a second or main distribution chamber 72 is defined between the partition 70 and the piston 66', which is aligned with a central width portion or band B of the workpiece, which is of adjustable dimension. Further, the piston 66' includes a pair of longitudinally spaced apart piston heads 74, 75 which define a third distribution chamber 76 therebetween, which is aligned with the opposite side edge portion or band C of the workpiece, and which is of fixed dimension.

A first gas inlet 78 communicates with the first distribution chamber 71, and a second gas inlet 79 communicates with the main distribution chamber Also, a third gas inlet is provided for the third distribution chamber 76 defined between the piston heads 74, 75 which comprises a tubular piston rod 80 connected to the piston heads and a plurality of openings 81 in the tubular piston rod positioned between the piston heads 74, 75.

Provision is also made for supplying a gas to each of the three distribution chambers 71, 72, 76 under controlled conditions. In particular, the gas supply system includes a gas supply 90, having a first line 91 leading to a gas flow rate control 92 and then to the first gas inlet 78. A second line 94 leads from the supply 90 to a second separate control 95, which then leads to the second gas inlet 79. Finally, a third line 97 leads to a third separate control 98, and then to the tubular piston rod 80 and then to the third distribution chamber 76.

In accordance with the present invention, the depth of scarfing cut may be separately controlled for each of the three width segments of the workpiece which correspond to the three distribution chambers 71, 72, 76, it being understood that a higher gas flow rate onto the surface of the workpiece will result in a deeper scarfing cut. Specifically, the depth of cut for each width segment may be determined by the operator and set by appropriate adjustment of the flow rate controls. Typically, the settings of the controls are based upon the grade of the steel, its temperature, and metallurgical quality. Also, the settings may be adjusted after visually or otherwise monitoring the operation of the apparatus, to tune the overall operation of the process and achieve the desired surface conditions in accordance with the end product quality requirements of the user.

In the drawings and specification, there has been set forth a preferred embodiment of this invention, and even though specific terms are used, they are used in a generic and descriptive sense only and not for purposes of limitation.

What is claimed is:

1. An apparatus for directing a stream of a gas across the width of a moving metal workpiece during a scarfing operation, and comprising a gas distribution manifold defining an elongate mounting surface which defines a longitudinal direction, at least one gas distribution bore in said manifold which extends parallel to said longitudinal direction, a plurality of longitudinally spaced apart drillings extending radially from said bore to said mounting surface, a gas inlet connected to said bore adjacent one end thereof for introducing a gas into said bore, and a longitudinally movable piston mounted in said bore to close the opposite end thereof and define a distribution chamber of variable longitudinal length between said one end and said piston, a plurality of scarfing units mounted in a side by side arrangement along said mounting surface, said scarfing units each including a rear face contiguous to said mounting surface and a forwardly facing front face, and a plurality of ducts extending through each of said scarfing units from said rear face to said front face thereof, with the ducts communicating with respective ones of said drillings at the interface of said mounting surface and said rear faces, and whereby a gas may be delivered from said distribution chamber of said bore to the ducts of said scarfing units and discharged from said front faces thereof along a variable longitudinal length dimension by control of the longitudinal position of said piston, the improvement wherein said distribution bore is divided into a plurality of separate distribution chambers, with each of said chambers having a separate gas inlet, with the longitudinal length of at least one of said chambers being dependent on the longitudinal positioning of said piston, and so that the gas may be delivered to the separate chambers under varying conditions to thereby permit the amount of the gas delivered to the scarfing units to be varied at selected locations along the longitudinal direction and across the width of the workpiece, said distribution bore mounting a fixed partition dividing the same into a first side edge distribution chamber between said one end and said partition and a main distribution chamber between said partition and said piston, and further including a first gas inlet communicating with said first side edge distribution chamber and a second gas inlet communicating with said main distribution chamber, and said piston including a pair of longitudinally spaced apart piston heads defining an opposite side edge distribution chamber therebetween, and a third gas inlet communicating with said opposite side edge distribution chamber.

2. The apparatus as defined in claim 1 wherein said third gas inlet comprises a tubular piston rod connected to said piston heads, and a plurality of openings in said tubular piston rod between said piston heads.

3. The apparatus as defined in claim 2 further comprising control means operatively connected to each of said gas inlets for permitting the pressure of the gas delivered to each of said gas inlets to be separately controlled.

4. A gas distribution manifold for a metal scarfing apparatus comprising a block of metallic material including an elongate mounting surface formed on one face thereof and which defines a longitudinal direction, at least one gas distribution bore in said block which extends parallel to said longitudinal direction and which defines a first end and an opposite second end, and a plurality of longitudinally spaced apart drillings extending radially from said bore to said mounting surface, a partition fixed in said bore at a location adjacent but spaced from said first end so as to define a first chamber in said bore between said first end and said partition, a piston slidably mounted in said bore at a location between said partition and said second end so as to define a second chamber in said bore between said partition and said piston, said piston including a pair of longitudinally spaced apart piston heads defining a third chamber in said bore between said piston heads, a first gas inlet communicating with said first chamber, a second gas inlet communicating with said second chamber, and a third gas inlet communicating with said third chamber, whereby the axial extend of the second chamber may be varied by longitudinally moving said piston to thereby vary the longitudinal length of the drillings which are open to one of said chambers.

5. The apparatus as defined in claim 4 wherein said third gas inlet comprises a tubular piston rod connected to said piston heads, and a plurality of openings in said tubular piston rod between said piston heads.

6. The apparatus as defined in claim 5 further comprising control means operatively connected to each of said gas inlets for permitting the pressure of the gas delivered to each of said gas inlets to be separately controlled.

7. The apparatus as defined in claim 6 further comprising a plurality of scarfing units mounted in a side by side arrangement along said mounting surface, said scarfing units each including a rear face contiguous to said mounting surface and a forwardly facing front face, and a plurality of ducts extending through each of said scarfing units from said rear face to said front face thereof, with the ducts communicating with respective ones of said drillings at the interface of said mounting surface and said rear faces, and whereby a gas may be delivered from said distribution chambers of said bore to the ducts of said scarfing units and discharged from said front faces thereof along a variable longitudinal length dimension by control of the longitudinal position of said piston.

8. The apparatus as defined in claim 7 wherein said drillings extend along substantially the entire longitudinal length of said bore.

* * * * *